3,408,446
SUPPRESSING COUGHS AND INCREASING SECRETIONS IN WARM-BLOODED ANIMALS WITH N-(AMINO-3,5-DIHALOBENZYL)-CAMPHIDINES
Johannes Keck, Biberach an der Riss, Germany, assignor to Boehringer Ingelheim GmbH, Ingelheim am Rhein, Germany, a corporation of Germany
No Drawing. Continuation-in-part of abandoned application Ser. No. 438,741, Mar. 10, 1965, which is a continuation-in-part of abandoned application Ser. No. 237,714, Nov. 14, 1962. This application June 30, 1967, Ser. No. 650,204
Claims priority, application Germany, Nov. 20, 1961, T 21,147
7 Claims. (Cl. 424—267)

ABSTRACT OF THE DISCLOSURE

Novel antitussive compositions having as the active ingredient N-(amino-3,5-dihalobenzyl)-camphidines of the formula

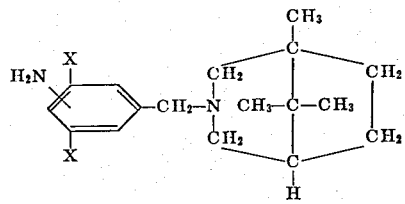

wherein X is a halogen selected from the group consisting of bromine and chlorine and their non-toxic, pharmaceutically acceptable acid addition salts and a novel method of suppressing cough and producing secretion in warm-blooded animals.

Prior applications

This application is a continuation-in-part application of U.S. patent application Serial No. 438,741 filed March 10, 1965, now abandoned, which in turn is a continuation-in-part application of U.S. patent application Serial No. 237,714, filed November 14, 1962, now abandoned.

Prior art

United States Patent No. 2,983,728 discloses certain N-(aralkyl)-camphidine compounds which may contain halogen, lower alkyl, lower alkoxy, nitro or amino substituents in the aralkyl radical and which possess a depressing activity upon the central nervous system or a sedative effect. In contrast thereto, the compositions of the invention unexpectedly possess secretolytic and antitussive activities without any sedative effect.

Objects of the invention

It is an object of the invention to provide novel antitussive compositions which contain as the active ingredient an N-(amino-3,5-dihalobenzyl)-camphidine of Formula I.
It is another object of the invention to provide a novel method of suppressing coughing in warm-blooded animals.
These and other objects and advantages of the invention will become obvious from the following detailed description.

The invention

The novel antitussive compositions of the invention are comprised of a small but effective amount of at least one compound selected from the group consisting of N-(amino-3,5-dihalobenzyl)-camphidines of the formula

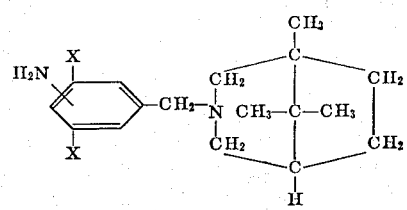

wherein X is a halogen selected from the group consisting of bromine and chlorine and their non-toxic, pharmaceutically acceptable acid addition salts and a major amount of a pharmaceutical carrier. The usual effective single dose is 10 to 100 mg., preferably 25 to 50 mg./kg. of the active ingredient in warm-blooded animals. The compositions may be in the form of tablets, coated pills, hypodermic solutions, syrups, etc., made by the usual methods.

The camphidine derivatives of Formula I may be made by methods well known for the synthesis of other halogenated aminobenzyl amines. Examples of suitable methods are as follows:

Method A

Chlorination or bromination of an N-(2 or 4-aminobenzyl)-camphidine. The reaction is usually performed in an inert solvent, preferably in a halogenated hydrocarbon or glacial acetic acid and advantageously at room temperature. Two moles or a slight excess thereover of the halogenation agent, such as chlorine or bromine, are used per mole of the starting camphidine. The hydrohalide salts initially formed thereby may be isolated directly and purified by recrystallization or the compounds may be purified in known fashion by way of their free bases and then, if desired, be transformed into any other acid addition salt.

Method B

Reaction of a 2- or 4-diacylamino-3,5-dihalobenzyl halide with camphidine and subsequently splitting off the acyl radicals. This reaction is performed in the presence of an acid binding agent for the hydrogen halide split off by the reaction; an inorganic or tertiary organic base or an excess of at least one mole of camphidine per mole of the diacylamino-3,5-dihalo benzyl halide. The reaction is advantageously performed in the presence of an inert organic solvent such as ethanol, benzene, toluene, etc., and at elevated temperatures preferably at the boiling point of the solvent used. The deacylation may be effected according to known methods, preferably by heating the acylated compound with a dilute mineral acid.

Method C

Reduction of an N-(2- or 4-nitro-3,5-dihalo benzyl) camphidine performed according to known methods, preferably by catalytic reduction such as with hydrogen in the presence of precious metal catalysts such as palladium or platinum advantageously in an organic solvent such as methanol, ethanol, tetrahydrofuran or dioxane; or by reduction with hydrazine hydrate Raney nickel preferably in an organic solvent such as methanol; or by reduction with nascent hydrogen formed from iron, zinc or tin with a mineral acid. Other known processes of reduction may be used if desired.

The free bases obtained by the above methods may be transformed by known methods into their non-toxic, pharmaceutically acceptable acid addition salts such as reaction of the free base with an equimolar amount of an alcoholic solution of the desired acid. Examples of suitable acids are mineral acids such as hydrochloric acid, hydrobromic acid, sulfuric acid, phosphoric acid, etc., and organic acids such as lactic acid, citric acid, tartaric acid, maleic acid, 8-chlorotheophylline, etc. The acid addition salts are water soluble and the mono acid salts are especially desirable.

The starting materials may be prepared by known methods. For instance, the N-(aminobenzyl)-camphidines may be obtained by reacting a nitrobenzyl halide with camphidine and reducing the nitro group. The diacyl-amino-3,5-dihalobenzyl halides may be prepared by reacting a 2- or 4-diacylamino-3,5-dihalo toluene with bromosuccinimide.

The method of the invention for suppressing cough and producing secretion in warm-blooded animals comprises administering to warm-blooded animals a safe but effective amount of a compound selected from the group consisting of N-(amino-3,5-dihalobenzyl)-camphidines of the formula

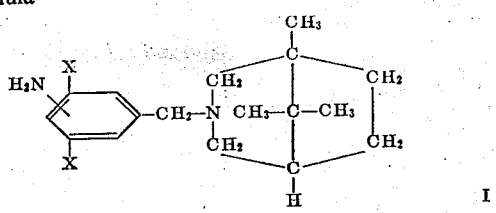

wherein X is a halogen selected from the group consisting of bromine and chlorine and their non-toxic, pharmaceutically acceptable acid addition salts. The said compound may be administered orally.

In the following examples there are described several preferred embodiments to illustrate the invention. However, it should be understood that the invention is not intended to be limited to the specific embodiments.

EXAMPLE I.—Preparation of N-(4-amino-3,5-dibromobenzyl)-camphidine hydrochloride 61.3 gm. of 4-diacetylamino-3,5-dibromobenzyl bromide dissolved in 1500 cc. of carbon tetrachloride were mixed with 14.6 gm. of triethylamine and 77.5 gm. of a 46.7% solution of camphidine in tetralone and the mixture was heated to reflux for one hour. Then the mixture was cooled and after the precipitated triethylammonium bromide was removed by filtration, the filtrate was concentrated to dryness. The residue was dissolved in 350 cc. of ethanol and 190 cc. of concentrated hydrochloric acid and the resulting solution was refluxed for 25 hours. After partial removal of the solvent, the solution was made alkaline and was extracted several times with petroleum ether. The extracts were combined, dried and concentrated.

The raw residue was purified by subjecting it to chromatography through a column of alumina and N-(4-amino-3,5-dibromobenzyl)-camphidine hydrochloride was precipitated from absolute ethyl acetate with gaseous hydrogen chloride. Upon recrystallization from a mixture of ethanol-ether, the said product had a melting point of 238–241°C. (decomposition).

EXAMPLE II.—Preparation of N-(2-amino-3,5-dichlorobenzyl)-camphidine hydrochloride Using the procedure of Example I, N-(2-amino-3,5-dichlorobenzyl)-camphidine hydrochloride was prepared from 2-diacetylamino-3,5-dichlorobenzyl chloride and camphidine. The said product had a melting point of 217–219°C. (decomposition).

EXAMPLE III.—Preparation of N-(4-amino-3,5-dichlorobenzyl)-camphidine hydrochloride Using the procedure of Example I, N-(4-amino-3,5-dichlorobenzyl)-camphidine hydrochloride was prepared from 4-diacetylamino-3,5-dichlorobenzyl chloride and camphidine. The said product had a melting point of 224 to 226°C.

EXAMPLE IV.—Preparation of N-(2-amino-3,5-dibromobenzyl)-camphidine hydrochloride Using the procedure of Example I, N-(2-amino-3,5-dibromobenzyl)-camphidine hydrochloride was prepared from 4-diacetylamino-3,5-dibromobenzyl bromide and camphidine. The said product had a melting point of 109–111°C.

PHARMACOLOGICAL EXAMPLES

Example A—Drops 1.00 gm. of N-(4-amino-3,5-dibromobenzyl)-camphidine-hydrochloride, 0.035 gm. of methyl p-hydroxybenzoate, 0.015 gm. of propyl p-hydroxybenzoate, 0.05 gm. of aniseed oil and 0.06 gm. of menthol were dissolved in 10.00 gm. of pure ethanol to form solution A. 1.00 gm. of sodium salt of saccharin was dissolved in sufficient distilled water to make a total volume of 100 cc. when mixed with solution A and then 15.00 gm. of glycerine was added to form solution B. The solutions were admixed and filtered to obtain a drop solution in which 1 cc. contained 10 mg. of N-(4-amino-3,5-dibromobenzyl)-camphidine hydrochloride.

Example B—Cough syrup 50 cc. of distilled water were heated to 80° C. and then 0.07 gm. of methyl p-hydroxybenzoate, 0.03 gm. of propyl p-hydroxybenzoate, 70.0 gm. of lactose, 0.20 gm. of sodium salt of saccharin, 0.30 gm. of pure tartaric acid, 2.40 gm. of sodium phosphate-12H$_2$0 and 0.4 gm. of N-(4-amino-3,5-dibromobenzyl)-camphidine hydrochloride were dissolved therein. Then a solution of 0.11 gm. of eucalyptus-menthol essence and 0.02 gm. of raspberry flavor dissolved in 2.00 cc. of pure ethanol were added to the mixture. After adjusting the total volume to 100 cc. the solution was filtered to obtain a cough syrup which contained 40 mg. of N-(4-amino-3,5-dibromobenzyl)-camphidine hydrochloride per cc.

Example C—Tablets 50.0 mg. of N-(4-amino-3,5-dibromobenzyl)-camphidine hydrochloride and 40.0 mg. of dicalcium phosphate were granulated with 80% alcohol and then dried to form granulate A having a screen mesh width of 1 mm. 70.0 mg. of lactose and 40.0 mg. of dried potato starch were granulated with a 15% solution of 5.0 mg. of APS-starch (soluble starch) and then dried at 45° C. to obtain granulate B having a screen mesh width of 1 mm. The dried granulates were admixed with 13 mg. of talcum and 2.0 mg. of magnesium stearate and were compressed into tablets having a diameter of 9 mm. and a weight of 220 mg.

Example D—Dragees

The tablets of Example C were coated in the customary manner with a coating consisting essentially of talcum and sugar and were then polished with beeswax to obtain degrees (coated tablets), having a weight of 350 mg.

Example E—Suppositories 40.0 mg. of N - (4 - amino - 3,5 - dibromobenzyl)-camphidine hydrochloride was sifted through a screen with a mesh width of 0.15 mm. and was then added to 1680.0 mg. of Imhausen substance H (a suppository base)

melted at 37° C. The melt was then cooled to 32° C. and poured into prechilled suppository forms.

Example F—Ampules 20.0 mg. of N - (4 - amino - 3,5 - dibromobenzyl)-camphidine hydrochloride and 10.0 mg. of sodium chloride were dissolved in sufficient double distilled water to obtain a final volume of 3 cc. The solution was then filtered until free of all suspended particles and after sterilization at 100° C. for 30 minutes, the solution was decanted into white 3 cc. ampules.

PHARMACOLOGICAL STUDY

Test A

The pharmacological test method for secretolytic activity employed for these tests was that of W. F. Perry et al. [Journal of Pharmacology and Experimental Therapy, vol 73, page 65 (1941)].

Briefly summarized, this test method consists of anesthetizing laboratory rabbits weighing from 2.1 to 2.8 kg. with ethylurethane, (1.25 gm./kg. I.P.). The unconscious animals are then strapped to a table whose top is at an angle of 60° with the horizontal, head down. The trachea of each animal is then cannulized and the cannula is connected to a device which provides for a uniform supply of prewarmed (36–38° C.) air of constant relative humidity (80%) to the trachea and lungs. A graduated cylinder is connected to the lower end of each cannula to collect the secreted bronchial fluid. All of the animals breathe spontaneously and thus determine by themselves the amount of air required for adequate breathing. The amount of normally secreted bronchial fluid is then measured over a period of 1 hour. Thereafter, the compound under investigation is perorally administered at a given dosage in the form of a solution of 1 ml./kg. of a physiological aqueous sodium chloride solution through a catheter fastened in the esophagus and extending into the stomach. As a control, i.e., to determine what extent, if any, the physiological sodium solution by itself produces a change in the rate of trachea-bronchial secretion, the sodium solution is administered in exactly the same fashion to each animal in an amount of 1 ml./kg., and the amount of secreted bronchial fluid is measured for each animal. The amount of secreted fluid is recorded for each compound and the control in each animal at one-hour intervals over a total period of five hours. After conclusion of the tests, the results are statistically evaluated and expressed in terms of the maximum percentage increase in the amount of secretion over and above the normal amount of secretion. The following results were obtained:

TABLE I

| Compound | Number of Rabbits | Dose, mg./kg. | Bronchial secretion (ml./h.) | | |
|---|---|---|---|---|---|
| | | | Before drug | After drug—max. increase | |
| | | | | Ml. | Percent |
| N-(2,4-dichlorobenzyl)-camphidine (Ex. IIB of Rubinstein) | 6 | 2 | 0.95 | 1.0 | 5 |
| N-(3,5-dibromo-2-amino-benzyl)-camphidine (Claim 6) | 6 | 2 | 0.93 | 1.35 | 45 |
| Physiological NaCl-solution | 20 | ¹2 | 1.97 | 2.27 | 13 |

¹ Milliliters.

An impartial and objective examination of these results clearly shows that while the compound described by Rubinstein exhibits no expectorant activity, applicant's compound exhibits a very clear and distinct expectorant activity. The Examiner's attention is particularly drawn to the fact that the maximum increase of 5% in the amount of secreted bronchial fluid in the case of Rubinstein's compound does not signify expectorant activity, because it is possible to obtain an increase of 13% with the physiological sodium chloride solution alone. In other words, the value for Rubinstein's compound is well within the limits of error established by the control tests, whereas the value for applicant's compound is clearly outside these limits.

Test B

The pharmacological test method for pectoral effectiveness used was that of Charlier et al. (Arch. Intern. Pharmacodyn., vol. 134, 1961, pp. 306–327).

Groups of 10 rats wer used for the test in which coughing was induced by inhalation of 7.5% aqueous citric acid spray. The test substances were administered at a dose of 15 mg./g. of rat intraperitoneally or 50 mg./kg. of rat per os with the comparative test with codeine being effected on the same day to avoid any atmospheric influence. The results obtained were as follows:

TABLE II

| Compound | Dose, mg./kg. | Application | Number of Coughs | | |
|---|---|---|---|---|---|
| | | | Before drug | After drug | reduction Percent |
| N-(4-amino-3,5-dibromobenzyl) camphidine. | 15 | Intra-peritoneal. | 25 | 10 | 60 |
| | 50 | Per os | 58 | 42 | 28 |
| Codeine | 15 | Intraperitoneal. | 17 | 9 | 47 |
| | 50 | Per os | 42 | 25 | 41 |
| N-(4-amino-3,5-dichlorobenzyl)-camphidine. | 15 | Intraperitoneal. | 53 | 23 | 54 |
| Codeine | 15 | Intraperitoneal. | 66 | 30 | 55 |
| N-(2-amino-3,5-dichlorobenzyl)-camphidine. | 50 | Per os | 55 | 36 | 35 |
| Codeine | 50 | Per os | 62 | 29 | 54 |

The said compounds of the above-identified application clearly have a good antitissue activity.

Test C.—Toxicity

The toxicity data was determined on white mice having an average body weight of 24 g. The test compounds were administered orally to groups of 5 mice in dosages of 1000, 1500, and 3000 mg./kg. as a suspension in 2% tylose solution. The animals were observed for 3 days. The compounds tested were N-(2-amino-3,5-dibromo-benzyl)-camphidine and N-(4-amino-3,5-dibromobenzyl)-camphidine. Since none of the animals died, the $LD_{50}$ of the compounds was well above 3000 mg./kg. of mouse.

In addition, during the said pharmacological tests of the compounds of the above application, constant observations of the test animals were made for sedative symptoms, but none occurred. Therefore, it is obvious that the compounds of the said application do not possess sedative activity.

Various modifications of the compositions of the invention may be made without departing from the spirit or scope thereof, and it is to be understood that the invention is to be limited only as defined in the appended claims.

I claim:

1. A method of suppressing coughs and increasing secretion in warm-blooded animals which comprises administering to warm-blooded animals in need of such treatment a safe and effective amount of at least one compound selected from the group consisting of N-(amino-3,5-dihalobenzyl)-camphidines of the formula

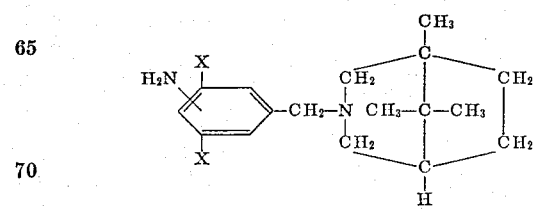

wherein X is a halogen selected from the group consisting of bromine and chlorine and their nontoxic, pharmaceutically acceptable acid addition salts.

2. The method of claim 1 wherein the said compound is N-4-amino-3,5-dibromobenzyl)-camphidine hydrochloride.

3. The method of claim 1 wherein the said compound is N-(2-amino-3,5-dichlorobenzyl)-camphidine hydrochloride.

4. The method of claim 1 wherein the said compound is N-(4-amino-3,5-dichlorobenzyl)-camphidine hydrochloride.

5. The method of claim 1 wherein the said compound is N-(2-amino-3,5-dibromobenzyl)-camphidine hydrochloride.

6. A method of suppressing coughs and increasing secretion in warm blooded animals which comprises administering to warm-blooded animals in need of such treatment 10 to 100 mg./kg. of N-(4-amino-3,5-dibromobenzyl)-camphidine hydrochloride.

7. The method of claim 6 wherein the dosage is 25 to 50 mg.

References Cited

UNITED STATES PATENTS 2,983,728   5/1961   Rubinstein _____ 260—293

ALBERT T. MEYERS, *Primary Examiner.*

SAM ROSEN, S. J. FRIEDMAN, *Assistant Examiners.*